US006735178B1

(12) United States Patent
Srivastava et al.

(10) Patent No.: US 6,735,178 B1
(45) Date of Patent: May 11, 2004

(54) METHOD FOR MAXIMIZING THROUGHPUT FOR MULTIPLE LINKS USING DIRECTIONAL ELEMENTS

(75) Inventors: Arty Srivastava, Santa Clara, CA (US); Michael W. Ritter, Los Altos, CA (US); Robert J. Friday, Los Gatos, CA (US)

(73) Assignee: Ricochet Networks, Inc., Denver, CO (US)

( * ) Notice: Subject to any disclaimer, the term of this patent is extended or adjusted under 35 U.S.C. 154(b) by 0 days.

(21) Appl. No.: 09/568,658

(22) Filed: May 10, 2000

(51) Int. Cl.[7] .............................................. H04L 12/28
(52) U.S. Cl. ........................................ 370/252; 370/351
(58) Field of Search ................................. 370/254, 238, 370/351, 400

(56) References Cited

U.S. PATENT DOCUMENTS

| | | | |
|---|---|---|---|
| 4,718,081 A | 1/1988 | Brenig | |
| 4,780,885 A | 10/1988 | Paul et al. | |
| 4,850,036 A | 7/1989 | Smith | |
| 4,974,224 A * | 11/1990 | Boone | 370/400 |
| 5,007,052 A | 4/1991 | Flammer | 370/400 |
| 5,253,161 A * | 10/1993 | Nemirovsky et al. | 709/241 |
| 5,257,399 A | 10/1993 | Kallin et al. | |
| 5,280,288 A | 1/1994 | Sherry et al. | |
| 5,355,522 A | 10/1994 | Demange | |
| 5,381,404 A * | 1/1995 | Sugano et al. | 370/238 |
| 5,488,608 A | 1/1996 | Flammer, III | 370/389 |
| 5,513,183 A | 4/1996 | Kay et al. | |
| 5,541,954 A | 7/1996 | Emi | |
| 5,546,422 A | 8/1996 | Yokev et al. | |
| 5,561,790 A * | 10/1996 | Fusaro | 703/26 |
| 5,619,493 A | 4/1997 | Ritz et al. | |
| 5,737,358 A | 4/1998 | Ritz et al. | |
| 5,805,633 A | 9/1998 | Uddenfeldt | |
| 5,937,002 A | 8/1999 | Andersson et al. | |
| 5,987,011 A * | 11/1999 | Toh | 370/331 |
| 6,023,462 A | 2/2000 | Nieczyporowicz et al. | |
| 6,034,946 A * | 3/2000 | Roginsky et al. | 370/238 |
| 6,240,125 B1 | 5/2001 | Andersson et al. | |
| 6,252,861 B1 | 6/2001 | Bernstein et al. | |
| 6,260,072 B1 * | 7/2001 | Rodriguez-Moral | 709/241 |
| 6,272,313 B1 | 8/2001 | Arsenault et al. | |
| 6,301,244 B1 * | 10/2001 | Huang et al. | 370/351 |
| 6,321,271 B1 * | 11/2001 | Kodialam et al. | 709/241 |

FOREIGN PATENT DOCUMENTS

EP            631413 A2 * 12/1994   ........... H04L/12/56

OTHER PUBLICATIONS

Jones, L.R. et al. "An Integrated Approach to Network Routing". IEEE AFRICON 4th. Stellenbosch, South Africa. Sep. 24–27, 1996. vol 1. pp. 157–161.*
Stallings, William. "Data and Computer Communications: Second Edition". MacMillan Publishing Company, 1998. pp. 261–268.*
Kahn, Robert E., et al., *Advances in Packet Radio Technology*, Proceedings of the IEEE, Nov. 1978, vol. 66, No. 11.

* cited by examiner

*Primary Examiner*—Hassan Kizou
*Assistant Examiner*—Donald Mills
(74) *Attorney, Agent, or Firm*—Townsend and Townsend and Crew LLP

(57) ABSTRACT

In an imperfect mesh network or in a star network, the directionality of transmission and reception at each node, as through a directional antenna, is selected to maximize combined or multiple-link end-to-end information throughput. To this end, a maximum throughput metric is provided for separate links through the network between a source node and a collection of end-point nodes to be optimized which is based on 1) measurement of link quality with respect to neighboring nodes and 2) information about link quality and other factors related to propagation delay or "latency" as reported to it by other nodes regarding their neighboring links, and 3) based upon the busy-ness or capacity utilization at each link.

3 Claims, 2 Drawing Sheets

METHOD FOR MAXIMIZING THROUGHPUT FOR MULTIPLE LINKS USING DIRECTIONAL ELEMENTS

BACKGROUND OF THE INVENTION

This invention relates to directional antennas and methods for selecting which directional antenna to use to maximize data throughput of a multiple radio system where information is available about data throughput. The invention has particular application to a packet radio system wherein packets can carry information about end to end communication efficiency.

Packet radio networks are used throughout the world to provide data communication between nodes. These networks can communicate over several type of data communication network architectures, the major types being star (e.g., conventional wireline and cellular), bus (e.g., computer backplane, local area networks and cable television) and mesh (e.g., elements of the Internet web and the Metricom wireless network).

In a mesh network, a collection of nodes autonomously connect, send, receive, forward and analyze packetized traffic in the network, which is a shared resource having limitations on traffic capacity. In a star network, data is sent and received through collection point node in communication with a plurality of remote nodes. Both star and mesh networks can employ an element of directionality. There is a need to optimize performance throughput to the greatest number of users in these types of networks.

Heretofore, the nodes in so-called intelligent mesh networks have been able to develop performance metrics about themselves and their neighboring nodes that are useful in measuring throughput. One such network is Metricom's Ricochet data communication network. Reference is also made to prior Metricom work, such as METHOD AND SYSTEM FOR ROUTING PACKETS IN A PACKET COMMUNICATION NETWORK USING LOCALLY CONSTRUCTED ROUTING TABLES, U.S. Pat. No. 5,488,608 issued Jan. 30, 1996; and METHOD FOR ROUTING PACKETS BY SQUELCHED FLOODING, U.S. Pat. No. 5,007,052 issued Apr. 9, 1991. The level of performance is in many respects limited by the speed of the constituent links. Extending the performance of these types of networks is the subject of continuing development efforts. This invention represents further development.

SUMMARY OF THE INVENTION

According to the invention, in an imperfect mesh network or in a star network, the directionality of transmission and reception at each node, as through a directional antenna, is selected to maximize combined or multiple-link end-to-end information throughput. To this end, a maximum throughput metric is provided for a region of the network to be optimized which is based on 1) measurement of link quality with respect to neighboring nodes and 2) information about link quality and other factors related to propagation delay or "latency" as reported to it by other nodes regarding their neighboring links. One embodiment of the invention is optimized for downloading information from remote websites.

This invention represents an advance over the invention described in unpublished U.S. patent application Ser. No. 09/198,060 filed Nov. 28, 1998 in the name of George F. Flammer III and Curtis Bradford entitled METHOD AND APPARATUS FOR MAXIMIZING DATA THROUGHPUT IN A PACKET RADIO MESH NETWORK, the content of which is incorporated herein by reference and made a part hereof. The Flammer et al. technique provides optimization on a per-link basis. The present invention may use those per-link optimization tools. While this invention provides improved performance in both mesh networks and star networks, it works with greatest efficiency in star networks or in mesh networks where half of the endpoints are concentrated in small areas, an approximate equivalent to a multi-hop star network. An example is a typical microcellular wireless system where wired access points are placed at intervals to extract the data off of the wireless system and place it onto a wired backbone. A specific example is the Metricom Ricochet system.

The invention will be better understood by reference to the following detailed description in conjunction with the accompanying drawings.

DESCRIPTION OF THE SPECIFIC EMBODIMENTS

Figure 1:
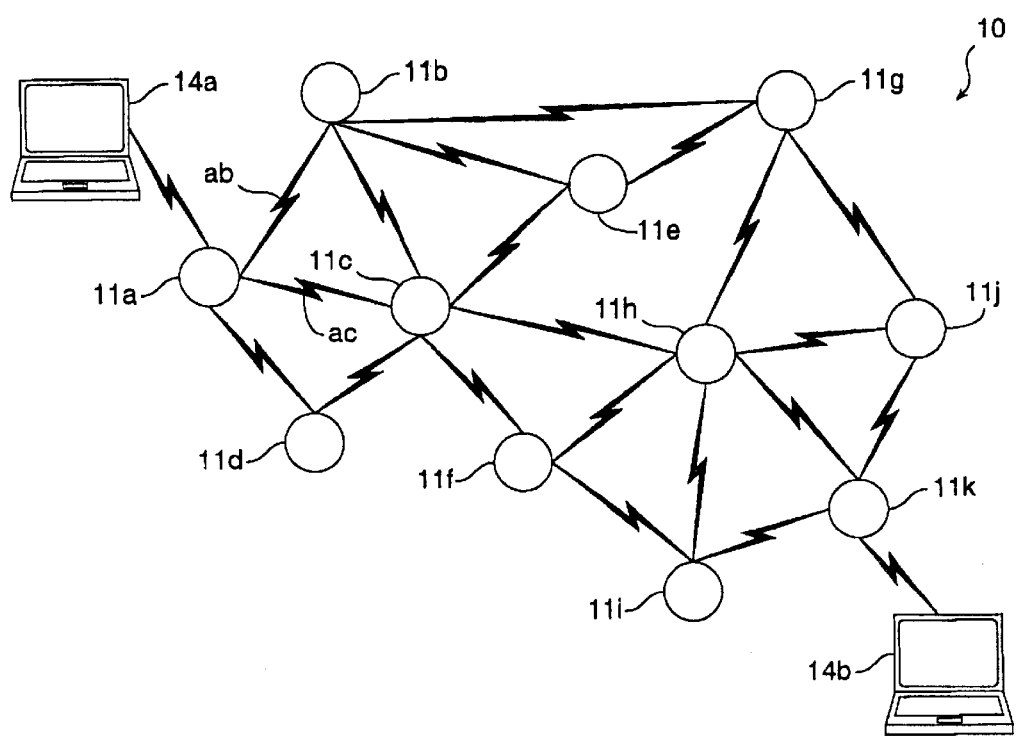
FIG. 1 is a block diagram of a mesh network illustrating nodes having a plurality of data rate capabilities in accordance with the invention.

Referring to FIG. 1, there is shown a block diagram of a mesh network 10 illustrating nodes A, B, C, D, E, F, G, H, I, J, K numbered 11a–11k, respectively, interconnected by wireless links (such as the link ab between nodes A and B and link ac between nodes A and C). While a mesh network is shown, it should be understood that at any instant in time, the ends of the network, as at nodes 11a and 11k, appear to be nodes in a star or multi-hop star network and thus serve as data collection and broadcast points (such as collection and broadcast points for illustrated user terminals 14a and 14b). In accordance with the invention, each node 11 has capabilities for transmitting to and receiving from various other nodes 11 at one of a plurality of data rates in each direction. In such a network 10, an interconnected mesh of data-packet sending and receiving nodes is collectively collecting, routing and delivering data packets.

The network 10 has a controller at each node 11. Each controller-controlled radio-based node 11 monitors traffic and the success of traffic, as indicated by repetitions, information on lost packets, queuing delay of the packets in the nodes and the like, and constantly develops performance metrics between itself and other regularly-linked nodes. This information about link quality with respect to each of its neighboring nodes thus constitutes a resource state of the node. It is retained locally and reportable to other nodes. Each node 11 may then optionally and dynamically vary one or more signal characteristics of signals transmitted to other nodes 11 on a per-link basis to maintain the highest possible network speed. According to the invention, the node 11 can also vary the directionality of transmission of data and can determine the link speeds and other parameters for each direction of transmission for each link. It should be noted that the links may, but need not, share the same spectrum or time slot, in a time slotted or frequency hopping network.

The network 10 has a controller 24 at each node 11. Each controller-controlled radio-based node 11 monitors traffic and the success of traffic, as indicated by repetitions, information on lost packets, queuing delay of the packets in the nodes and the like, and constantly develops performance metrics between itself and other regularly-linked nodes. This information about link quality with respect to each of its neighboring nodes thus constitutes a resource state of the node. It is retained locally and reportable to other nodes. Each node 11 may then optionally and dynamically vary one or more signal characteristics of signals transmitted to other nodes 11 on a per-link basis to maintain the highest possible network speed. According to the invention, the node 11 can also vary the directionality of transmission of data and can determine the link speeds and other parameters for each direction of transmission for each link. It should be noted that the links may, but need not, share the same spectrum or time slot, in a time slotted or frequency hopping network.

According to the invention, the specific directionality element of a group of such elements (antennas) at a given node 11$k$ or 11$a$ is chosen which has the highest "weighted throughput" of information between a selected source and a selected destination, after eliminating from consideration those directionality elements in the node network which have unacceptably high fragment error rates (FER) where a fragment is defined as the number of bits which is the smallest collection of data that can be retransmitted upon failure.

Each node, including the node of interest that desires to maximize throughput, measures and collects information about link quality on its neighboring links for each of its directional elements. Each node also receives reports on resource state, which in the present invention consists of round-trip latency, the average time it takes to deliver an average packet from the source to the destination and back to the source, and busy-ness, the average percent of time a node spends transmitting or receiving, but may comprise other parameters, from the other nodes along the various paths between the source and the destination. For example, link quality can be measured using the single link quality measurement/calculation techniques described by Flammer III et al., cited above. Latency and busy-ness are reported quantities. Thus, by using this information, link quality, latency, busy-ness, and other parameters, a maximum throughput of data is provided between a source, such as a remote website, and a destination, such as a user client or a directionality-enabled node closest to a user client, which is the typical node of interest to have its throughput optimized. This maximized throughput of data is based on the maximized throughput of data of a particular directionality element or antenna.

The throughput of an individual link differs depending upon which antennae are used and is defined as the rate of data transfer from one node to another node for a particular antenna on the transmitting node as well as a variety other parameters such as the particular protocol used or the link budget between the two nodes. The parameters include the raw link speed, which can be variable, the error rate on the link, which depends upon the link budget between the two nodes, and specifically the packet fragment error rate (FER) in a packet system, the delay caused by any wiring of the link ("wired delay"), the queuing delay in the nodes and the protocol used on the link. The link speed measured may actually be a net link speed as measured after all inefficiencies due to errors, protocol overhead, and time spent transmitting at the different possible raw link speeds and the like are accounted for.

Latency as herein understood is a quantity of end-to-end efficiency, part of which is not measurable at the local node of interest. There is an outbound latency and an inbound latency, the sum of which is the round-trip time between receipt of a packet at the source and then transmission of a packet to the end point and its acknowledgment back to the source transmitter. Outbound latency is measured locally as the amount of queue delay and other factors. Inbound latency is a reported value for the accumulated latency on the path from the next node to the destination and back to the node of interest.

Simple link throughput (LT) is a calculation of the rate at which a unit amount of data is passed through a point of interest. For a unit of data of large size it is approximately the unit data size divided by total time required to transport that unit. Throughput must be calculated in the context of the particular protocol for a given unit data size since there are inherent inefficiencies in different protocols for different transmitted packet data sizes due to for example different overhead per packet and different retransmission efficiencies for the different protocols.

An example of a calculation of link throughput will illustrate this parameter. Consider a unit data size ("UDS") or file of 50 kilobytes (kB) transported according to FTP (File Transfer Protocol) in the TCP (Transmission and Control Protocol) suite. The total time ("TT") to transport a 50 kB UDS or file is given by the time duration of opening and closing the connection between the end points, plus the time to fully open the window or to 'ramp up' the data transmission speed to the maximum transmission speed, plus the time required to send the remainder of the data.

In this example, particular to the TCP protocol:

$TT=4*RTT+n*RTT+(UDS-(2^{n+155}-1)*PS)/NLE;$ where,

RTT is the "round-trip time" or time duration between sending a TCP packet (as from a server) and receiving its acknowledgment (back to the server), WS is the TCP window size (typically 8 KB), PS is the TCP packet size (typically 536 bytes), $n=\log_2(WS/PS)$, the number of RTT to open the window to its maximum value, and NLE is the net link speed or the maximum speed of delivered user data on the link when operating at its highest efficiency, and depends upon the antennae element used and the data link protocol, as well as the other parameters described above.

In this example, connection time is 4 RTTs. An FTP exchange requires 1.5 to 2 RTTs to start a connection and 2 RTTs to break the connection once data has been transferred. For HTTP (hyper-text transfer protocol) type connections and applications, the connection time is longer since more than one TCP connection is made in order to download a web page. The link throughput LT is then UDS/TT, and it is dependent on the directional element selected, as well as the other parameters described.

Figure 2:
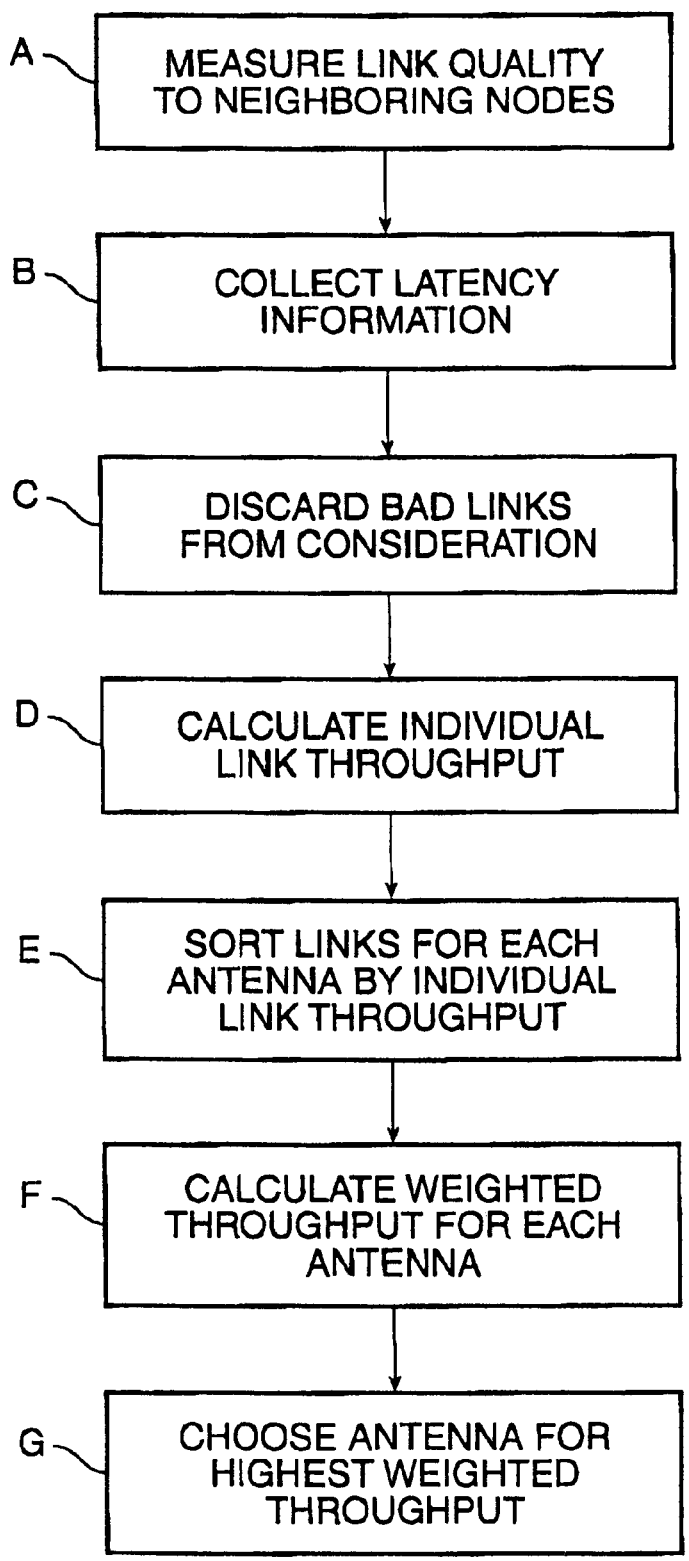
FIG. 2 is a flow chart illustrating the method according to the invention.

The method according to the invention applicable to antenna directionality can now be understood. Referring to the flow chart of FIG. 2, the first step is for the local node of interest to measure the link quality for each link to its neighboring nodes through each of the directionality elements (Step A). Hence, each directional antenna has associated with it a link quality value for each neighboring with which it may communicate. This is done according to any available scheme, one example of which is the Flammer technique. Next or simultaneously, the local node collects latency reports for relevant paths (different link to link routes) beyond the neighboring nodes to the remote end (Step B). Part of the outbound latency can be measured directly, as described above, since it relates to the queuing delay within the local node. This element of latency is of course independent of directionality. The remaining latency reports are collected from the neighboring nodes and for the nodes beyond the neighboring nodes along the potential data paths as the resource state information. The resource state information may be broadcast to the network or it may be reported in response to a query from the local node.

Next, the local node discards the bad links, i.e., removes from consideration those of its local links between selected local directional antennas and neighboring nodes where the FER is greater an acceptable threshold (Step C). For example, all links with an FER>0.2 would be ignored from subsequent consideration as they could not provide the minimum throughput required in the system. Thus, calculations on poor links that will not be used in any case will not impact the calculation of the weighted throughput of each of the directionality elements of the antenna system. (Of course, if the FER improves, those links may be reconsidered.)

The next step is to calculate individual link throughput for each of the links (Step D) for each of the directional antennae elements. This is the simple link throughput calculation based on the total time calculation above.

The next step is to sort, for each directional element, the links in descending order of their calculated individual link throughput (Step E). All of the link throughputs available through that element must be considered, for example, in order to get the total throughput available for a particular directional element. If the best link is busy, then the local node would recognize that fact and use the next best link; if that link is also busy, the local node may then use the third best link, and so on. This procedure is then used to calculate the average throughput of each of the directional units of the antenna system. This is particular apropos in a mesh or multi-hop start network where many end-point destinations are possible and equivalent to each other.

Next, the weighted throughput (WT) of each directional element (not of each link) is computed (Step F). This is done by summing the simple link throughput times from least busy to busiest with a weighting based on busy-ness.

As a specific example, consider the following computation:

$$WT_a = \sum_{i=1}^{N} \left[ (1 - B_i) * LT_{ia} * \left( \prod_{k=1}^{i-1} B_k \right) \right],$$

where:

$B_i$ is the "busy-ness" measure or the ratio of transmission time to the listening time plus the transmission time, for the ith node at the end of each link, $LT_{ia}$ is the simple link throughput for the ith node, as calculated above for a particular directional element or antenna a, and $WT_a$ is the weighted throughput for the particular directionality element or antenna "a."

Finally, the directionality element, e.g., antenna, having the highest weighted throughput is chosen to support the local node for the end-to-end transmission session (Step G).

Since end-to-end data throughput is the ultimate parameter to be maximized, this technique, by taking advantage of a large amount of measured link quality information, as well as reported resource state information, makes it possible to optimize that throughput by directionality. In the wireless system contemplated, this maximization of throughput is an improvement over other less direct schemes of maximizing throughput based on secondary or only local parameters.

This invention works best in a multi-hop star network where end-to-end data throughput can be maximized around a relatively static point of data concentration. However, this invention also works well in a mesh network where end to end data throughput is to be maximized between several source and destination pairs substantially simultaneously which are competing for the same resources. Typically, the subject local node attempts to maximize throughput for only a single direct endpoint at a time, so in most instances, the local node appears like a concentrating node on a star network. This invention is particularly useful in support of an individual user at a client downloading pages from a website on a remote server. Data is transferred to a point of concentration and then provided to the client through the point of concentration, which is the local node of interest.

The invention has been explained with reference to specific embodiments. Other embodiments will be evident to those of skill in the art. It is therefore not intended that the invention be limited except as indicated by the appended claims.

What is claimed is:

1. In a multiple node network having a data collection node at a first end and a data transmission node at a second end, a method for selecting the directionality of transmission and reception at one of said nodes to maximize combined information throughput at said data collection end, comprising:

determining a throughput metric for each directional choice based on combined end to end throughput of information for said directional choice; and selecting directionality according to said throughput metric to maximize end to end throughput between said first end and said second end;

wherein said throughput metric is based on measurement of latency;

wherein said latency is attributable to busy-ness and includes summing simple link throughput times from least busy to busiest with a weighting based on said busy-ness; and wherein weighted throughput WT is determined as follows:

$$WT_a = \sum_{i=1}^{N} \left( (1 - B_i) * LT_{ia} * \left( \prod_{k=1}^{i-1} B_k \right) \right),$$

where:

$B_i$ is the busy-ness measure defined as the ratio of transmission time to the listening time plus the transmission time, for the ith node at the end of each link;

$LT_{ia}$ is the simple link throughput for the ith node for a particular directionality element a; and $WT_a$ is the weighted throughput for the directionality element a.

2. In a multiple node network having a data collection node at a first end, a data transmission node at a second end, and multiple wireless nodes at least at one of the first and second ends, the wireless nodes being equivalent but with different throughput metrics, a method for selecting the directionality of wireless transmission and reception at an antenna at one of the wireless nodes, the one wireless node being at or closest to a user, in order to maximize weighted information throughput for end-to-end transmissions, the method comprising:

determining at the one wireless node a throughput metric for each directional choice based on combined end-to-end throughput of information for said directional choice; and selecting at the one wireless node the directionality according to said throughput metric to maximize end-to-end throughput between said first end and said second end;

wherein weighted throughput WT is determined as follows:

$$WT_a = \sum_{i=1}^{N} \left[ (1-B_i) * LT_{ia} * \left( \prod_{k=1}^{i-1} B_k \right) \right],$$

where:
- $B_i$ is the busy-ness measure defined as the ratio of transmission time to the listening time plus the transmission time, for the ith node at the end of each link;
- $LT_{ia}$ is the simple link throughput for the ith node for a particular directionality element a; and
- $WT_a$ is the weighted throughput for the directionality element a.

3. The method of claim 2, wherein selecting the directionality of transmission and reception is at the data collection end.

* * * * *